United States Patent

Armasow et al.

[11] 4,194,600
[45] Mar. 25, 1980

[54] HYDRODYNAMIC DOUBLE BRAKE

[75] Inventors: Waldemar Armasow; Hans Lindenthal, both of Heidenheim, Fed. Rep. of Germany

[73] Assignee: Voith Getriebe KG, Heidenheim, Fed. Rep. of Germany

[21] Appl. No.: 970,343

[22] Filed: Dec. 18, 1978

[30] Foreign Application Priority Data

Dec. 22, 1977 [DE] Fed. Rep. of Germany ....... 2757240

[51] Int. Cl.² ............................................. F16D 57/02
[52] U.S. Cl. ..................................... 188/296; 60/343
[58] Field of Search ............... 188/290, 292, 294, 296; 60/342, 343, 347, 348, 360

[56] References Cited

U.S. PATENT DOCUMENTS

| | | | |
|---|---|---|---|
| 3,673,799 | 7/1972 | Audiffred et al. | 60/360 |
| 3,782,514 | 1/1974 | Mueller | 188/296 |
| 4,051,931 | 10/1977 | Vignon | 188/296 |

*Primary Examiner*—Duane A. Reger
*Attorney, Agent, or Firm*—Ostrolenk, Faber, Gerb & Soffen

[57] ABSTRACT

A hydrodynamic double brake includes two working chambers, each defined between a respective stator bucket wheel and a respective rotor bucket wheel. Each of the bucket wheels including buckets that extend into the respective working chambers and the bucket wheel buckets all are oriented at the same tilt angle with respect to the axis of the brake. An inlet line enters the rotor bucket wheels and then branches into the respective working chambers. Outlet ducts exit from each of the working chambers. A shell is defined around the bucket wheels and the brake and includes a valve arrangement which selectively opens the outlet ducts of one working chamber while closing the outlet ducts of the other working chamber, and vice versa. Fluid pressure responsive elements extend into the working chambers so that fluid in the one working chamber intended to be the active chamber impinges on the fluid responsive elements and thereby moves both of the valve arrangements to open the outlet ducts of only one of the working chambers. An appropriate separating wall arrangement is associated with the shell for reducing leakage between the utlet ducts of the two working chambers. The valve arrangement includes a cylindrical shell which is shiftable circumferentially around the working chambers and the shell in one embodiment or is shiftable axially of the brake in another embodiment for selectively opening and closing the working chamber outlet ducts.

29 Claims, 10 Drawing Figures

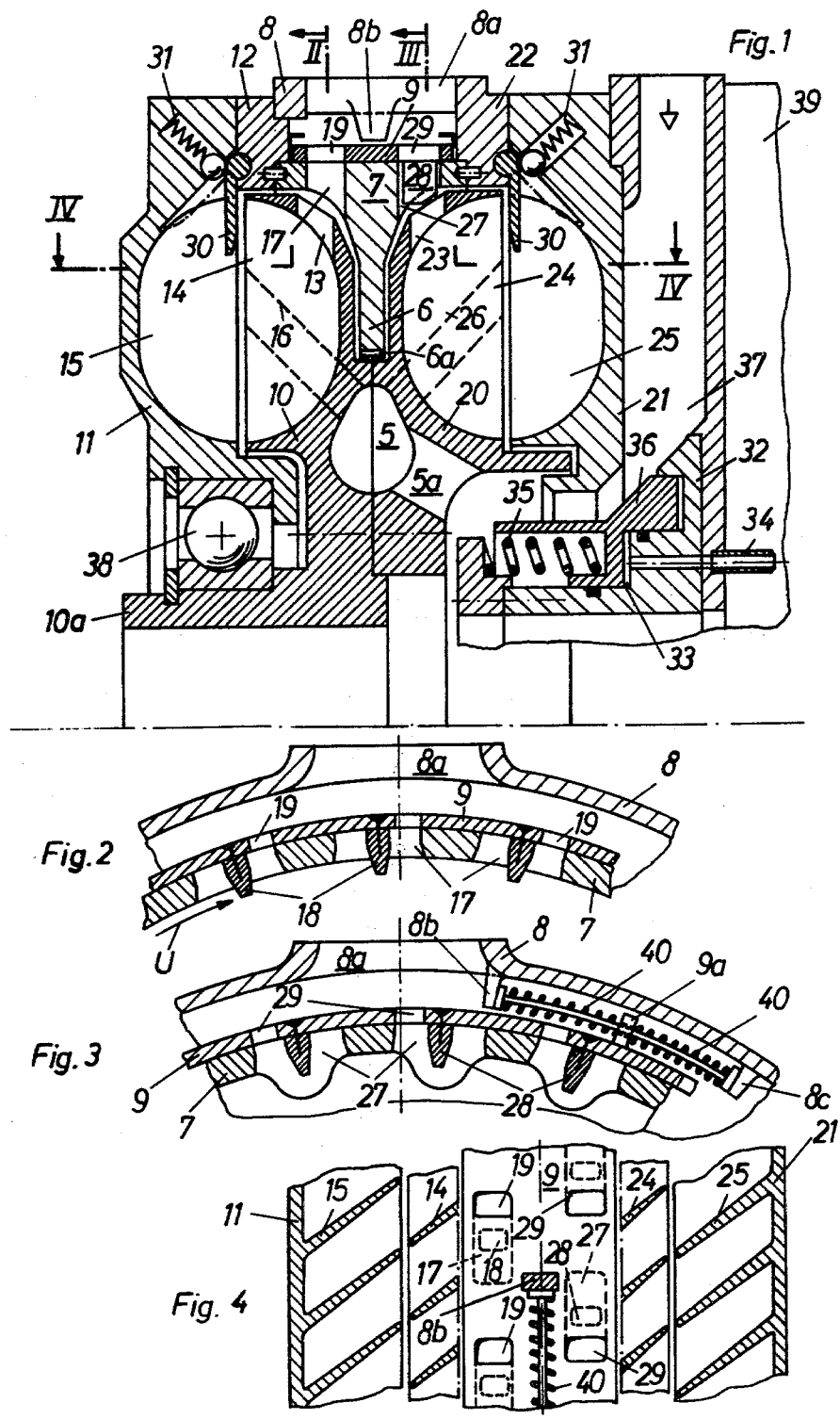

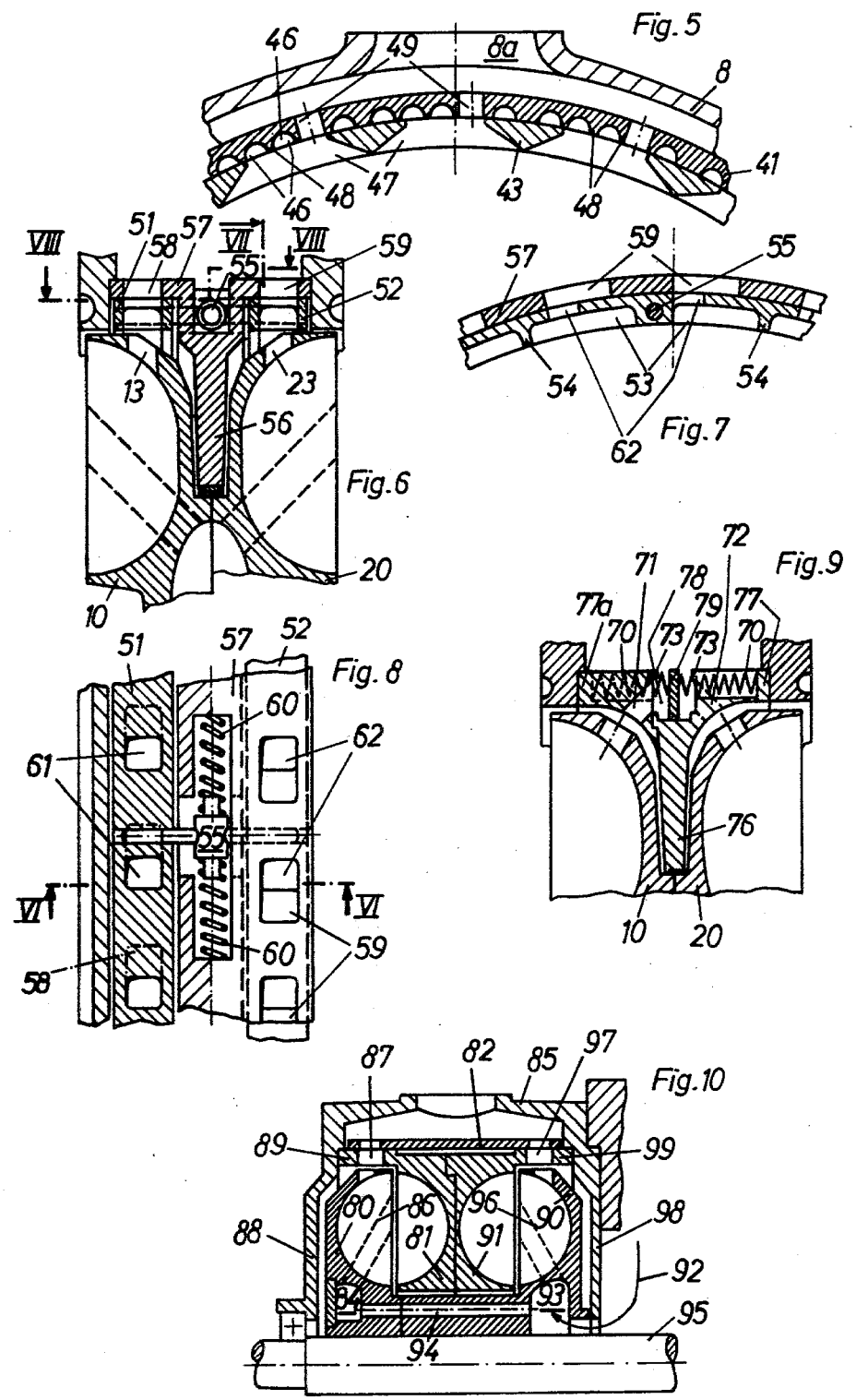

HYDRODYNAMIC DOUBLE BRAKE

The invention relates to a hydrodynamic double brake, which can produce a braking moment in both rotary directions.

BACKGROUND OF THE INVENTION

Such a double brake according to the invention is of the type comprising two rotor (or stator) bucket wheels that are arranged back to back, and which can be rotated together and also comprising two stator (or rotor) bucket wheels. The two sets of bucket wheels cooperate to form two toroidal working chambers which can be filled with working fluid. The buckets or blades of all four bucket wheels, viewed in cylindrical section, are all set at an angle in the same direction relative to the axis of rotation of the bucket wheels, so that in one rotary direction of the bucket wheels, only one of the working chambers is predominantly active, and in the other rotary direction, only the other working chamber is predominantly active. The brake also has a stationary shell, a common inlet line for both the working chambers, and has outlet ducts leading from the two working chambers.

Double fluid brakes of this kind can produce the same amount of braking moment in both rotary directions, which is necessary, for example, for railway vehicles.

Known double brakes of this kind are described in the following publications:
1. German Patent Specification No. 1,600,191.
2. German Laid-Open Patent Specification No. 1,755,818.
3. German Laid-Open Patent Specification No. 2,208,857.
4. German Laid-Open Patent Specification No. 2,211,379.
5. "Leichtbau der Verkehrsfahrzeuge". 1969, Pages 183 to 187.

In the above mentioned double brakes, either the two rotor bucket wheels or the two stator bucket wheels are arranged back to back in the center of the unit, and they are connected together to form a double bucket wheel. The two outer bucket wheels are connected together by a shell, which also surrounds the central double bucket wheel. Between the outer circumference of the central double bucket wheel and the shell there is an annular gap. The two working chambers of the double brake are interconnected through this gap.

Double brakes according to publications 1 and 2 have the drawback that the high fluid pressure prevailing in the radially outer region of the working chamber which is then active penetrates, via the annular gap, into the radially outer region of the working chamber which is then inactive at the time, and into the inlet line. This means that a filling pump that supplies working fluid has to work against undesirably high pressure. It has been proposed to overcome this disadvantage by arranging labyrinth seals in the above described annular gap (see publication 5 above, FIGS. 8 and 9). Although the transmission of pressure into the inactive working chamber can be obstructed by these means, it cannot be prevented completely. The filling pump, therefore, still requires a relatively high input. In addition, separate outlet ducts have to be provided, each with an overflow valve to serve as a control device (see publication 5 above, FIG. 12). A better result can be achieved with another known double brake (see publication 3 above) by giving each working chamber a separate inlet line with a non-return valve. In this way, the high pressure can only enter the inactive working chamber and can no longer penetrate into the inlet duct. The filling pressure required is quite low in this case, and a common outlet duct can also again be provided for both of the working chambers.

However, a disadvantage of this construction is that the separate inlet ducts take up a relatively large amount of space. As a result, this known brake cannot be used if only a small amount of space can be made available for a hydrodynamic brake, for example in a drive unit for a vehicle.

It is also known from publications 3 and 5 above to arrange the inlet ducts for the working chambers in the rotor bucket wheels (pump effect) instead of in the stator bucket wheels. This arrangement also means that the working fluid for the brakes can be supplied at a relatively low filling pressure.

SUMMARY OF THE INVENTION

An object of the present invention is to provide a hydrodynamic double brake which is equally effective in both rotary directions.

Another object of the invention is to provide such a brake which has the smallest possible dimensions, including the ducting and valves required.

A further object of the invention is to provide such a brake, wherein the working fluid can be supplied at the lowest possible pressure.

According to one aspect of the present invention, a hydrodynamic double brake of the type referred to above and having two rotor bucket wheels arranged back to back, includes a dividing wall that extends out from the shell toward the brake axis, between the rear faces of the rotor bucket wheels, so that, between the rotor bucket wheels and the shell, two hydraulically largely separate intermediate volumes are created. The shell is provided with an outlet valve arrangement with at least one moving valve element arranged to be actuated by the pressure head of the flow of fluid prevailing in its vicinity in such a way that the outlet ducts of each working chamber are opened when the rotary direction of the double brake is that direction in which the working chamber is active and are closed when the rotary direction of the brake is that direction in which the working chamber is largely inactive.

According to a second aspect of the present invention, a hydrodynamic double brake with two stator bucket wheels arranged back to back, has a single inlet line pass into the rotor and then branch inside the rotor into inlet ducts which open out in the working chambers. The shell has an outlet valve arrangement with at least one moving valve element, which is actuated by the pressure head of the flow of fluid prevailing in its vicinity in such a way that the outlet ducts of each working chamber are open when the rotary direction is that in which the respective working chamber is active and closed when the rotary direction is that in which the working chamber is largely inactive.

A double brake according to the above mentioned first aspect is based on the double brake according to publication 5 above, FIG. 8, in which the rotor bucket wheels are arranged back to back, which has a common inlet duct for both working chambers and in which the inlet duct branches out to the two working chambers only within the rotor. The possibility of installing non-return valves in the fluid lines on the inlet side, as described in publication 3 above, was therefore ignored. In return, there is the advantage that an inlet line need be arranged only on one side of the double brake, which results in a considerable saving of space. Such an arrangement is only possible if a novel way is found of achieving a filling pressure which is as low as possible. It was realized that for this purpose, a hydraulic separation of the two working chambers in the radially outer region of the double brake is required. To this end, a fixed annular dividing wall is provided between the rear faces of the rotor bucket wheels, extending out from the shell. At the radially inner limits of the annular wall, because the circumferential speed of the rotor is considerably less, sealing can be achieved much more effectively than at the outer circumference of the brake, where the speed is greater. Furthermore, the centrifugal force-dependent part of the fluid pressure is much less radially inwardly than radially outside. The dividing wall is therefore able to prevent working fluid from flowing over inside the shell and at the same time to prevent a spread of the pressure from the active to the inactive working chamber.

However, this cannot be done with the measures described above alone. The important factor is to find a construction which unlike known brakes according to publication 5 above, has only a single outlet for both the working chambers. The problem here lies in achieving In the second aspect of the invention, the known double brake according to German Patent Specification No. 1,573,887, FIGS. 6 to 11, is used as a basis. In this, the stator bucket wheels are arranged back to back in the center of the unit. Unlike the construction according to publication 5 above, FIGS. 9 and 12, they are connected to the shell. This means that it is not necessary to provide a dividing wall between the central bucket wheels. The shell comprises walls which are arranged behind the rear of the two outer rotor bucket wheels. Thus, the intermediate spaces referred to in the first aspect of the invention, which are largely hydraulically separate from each other, and which are located between the rear faces of the rotor bucket wheels and the shell, are provided by the design itself. Based on the known double brake and by providing inlet ducts in the rotor bucket wheels and an outlet valve arrangement, both analogous to the construction according to the first aspect of the invention, a double brake fulfilling the specified requirements is obtained.

At first it appeared necessary, due to the required function of the outlet valve arrangement, to provide a separate moving valve element for each working chamber. In certain cases this may still be expedient. By coupling the two valve elements together, however, a particularly reliable functioning of the outlet valve arrangement is achieved, since each valve element sup- The other advantage mentioned above, that any desired partial filling level can be established and stabilized, means, among other things, that, for removing the heat created, there is a good throughput of working fluid through the brake. In addition, the characteristic curves of the brake, its braking moment relative to the rotary speed of the rotor, are very stable, and the ratio between the greatest and the smallest amount of braking moment which can be established in operation with partial filling is very large.

All these advantages make the double brake according to the invention highly suitable for braking heavy tracked vehicles, such as tanks. In this type of tracked vehicle, and also with railway vehicles, a fluid brake is used when traversing slopes as a permanent brake. At the same time, however, the brake of the invention should also be suitable for use as a so-called stopping brake, unlike the fluid brakes in railway vehicles. In this case "stopping" does not mean braking more or less to a standstill, but instead means a sudden, even violent, braking of the tracked vehicle from a high travel speed. In other words, with a double brake of this kind, intense deceleration to a very low travel speed can be achieved. For braking to a standstill, friction brakes must be applied as well, in the normal way.

The amount of heat which is generated when the brakes are operated is considerable. Therefore, the flow of working fluid passing through the brakes must be correspondingly greater. For this reason, the design of the inlet and outlet lines and ducts is very important. They must have large cross-sections to allow high flow speeds. Owing to their large spatial requirement, common inlet and outlet lines are provided for the two working chambers, instead of separate ones, as already mentioned above.

The braking output of a brake according to the invention can amount to around 1000 kW when used in a tracked vehicle as a permanent brake, and to 5000 to 8000 kW when used as a stopping brake, although the stopping brake operates only for a very short period of time, e.g. a few seconds.

Other objects and features of the invention are now described with reference to the accompanying drawings.

BRIEF DESCRIPTION OF THE DRAWINGS

FIG. 1 is a partial longitudinal section through a hydrodynamic double brake according to an embodiment of the invention, FIG. 2 and FIG. 3 are partial cross-sections along the lines II and III respectively in FIG. 1, FIG. 4 is a partial cylindrical section along the line IV—IV in FIG. 1, FIG. 5 is a partial cross-section corresponding to FIG. 2, through a modified version of the double brake shown in FIGS. 1 to 4.

FIG. 6 is a partial longitudinal section through another brake along the line VI—VI in FIG. 8, FIG. 7 is a partial cross-section along the line VII in FIG. 6, FIG. 8 is a view partly in section and partly in elevation along the line VIII—VIII in FIG. 6, and FIGS. 9 and 10 are partial longitudinal sections through other embodiments of double brakes according to the invention.

DESCRIPTION OF THE PREFERRED EMBODIMENTS

The first embodiment of hydrodynamic double brake shown in FIGS. 1 to 4 comprises a first rotor bucket wheel 10 which is attached to a shaft which is not shown, and a second rotor bucket wheel 20. The two rotor bucket wheels 10, 20 are bolted together in a "back to back" arrangement and thereby form a double bucket wheel. Between the two rotor bucket wheels 10 and 20, an annular inlet duct 5 is formed. It is connected via several holes 5a to a fixedly positioned inlet line 37. The inlet ducts 16, 26 leading into the two working chambers of the brake from the annular inlet ducts 5 are shown in dashed lines.

In the usual way, a respective stator bucket wheel 11 or 21 is arranged opposite each rotor bucket wheel 10, 20. Each stator wheel and rotor wheel is hollowed out and cooperatingly placed to define the respective working chambers of the double brake. The other stationary parts of the fluid brake are an intermediate annular flange 12, an outer annular brake housing 8, on which a further intermediate flange 22 is formed, and an inner shell 7 which is inserted between the two intermediate flanges 12 and 22 and which together with the intermediate flanges 12 and 22, surrounds the rotor bucket wheels 10 and 20 at their outer circumferences. An annular dividing wall 6, formed on the inner shell 7, extends between the rear faces of the rotor bucket wheels and toward the rotary axis of the brake. The abovementioned stationary parts 7, 8, 11, 12, 21 and 22 are attached by means of bolts (not shown) to a gear housing 39 which includes the stationary inlet line 37. Between the stator bucket wheel 11 and the hub 10a of the rotor bucket wheel 10, there is a roller bearing 38 for enabling the rotor to revolve.

Referring to FIG. 4, the buckets or blades 14, 15 and 24, 25 of the four bucket wheels 10, 11 and 20, 21 are all set at the same angle relative to the direction of the axis of rotation. This means that the fluid brake produces the same amount of braking moment in both rotary directions under otherwise identical conditions. However, in one rotary direction, only one of the working chambers is predominantly active, and in the other rotary direction, the other working chamber is predominantly active.

As is known from German Laid-Open Patent Specification No. 2,135,268, in the radilly outer region of each stator bucket wheel, a plurality of rotatably mounted flaps 30 are provided. Each is rotatable around an axis that extends generally annularly about the respective stator wheel. When the brake is empty of working fluid, these flaps 30 are swung into the illustrated solid line positions in the working chambers by the force of springs 31, in order to reduce the windage losses, i.e. to obstruct the circulation of air in the working chambers. As soon as working fluid is located in the working chambers the flaps 30 are pivoted out of the working chambers by the pressure head of the flow of fluid, and into the position shown in FIG. 1 with dashed lines.

When the brake is operated, the pressure in the active working chamber is considerably higher than in the inactive working chamber, as has already been explained above. With the separating wall 6, the high pressure prevailing in the active working chamber does not spread inside the inner shell 7 into the inactive working chamber and thus working fluid does not flow from one working chamber to the other. According to how complete a hydraulic separation of the two working chambers is desired, a more or less effective seal is provided at the radially inner end 6a of the dividing wall 6, e.g. a narrow gap, a labyrinth seal, or the like, is placed there. Since such a seal is arranged in a region of relatively low circumferential speed, it accomplishes its purpose better than the above-mentioned labyrinth seal in the known brakes according to publication 5. If required, seals may also be provided in the vicinity of the rear end faces of the adjacent rotor bucket wheels.

Provision is made for removal of working fluid from the working chambers. At the outer circumference of the rotor bucket wheels 10 and 20, a plurality of radially extending holes 13, 23 are provided. In a similar way, in the inner shell 7, a plurality of radially directed holes 17, 27 are evenly distributed over the circumference of the shell. The unobstructed width of these holes is considerably greater in the circumferential direction of the brake than in the axial direction thereof (see FIG. 4). The shell 7 is surrounded by a sliding cylinder 9 made of relatively thin sheet metal. Together with the shell 7, the cylinder 9 forms a common outlet valve for both of the working chambers of the brake. Each of the holes 17, 27 in the shell 7 is associated with a hole 19 or 29, respectively, in the sliding cylinder 9. When the sliding cylinder 9 is open, the working fluid flows into the collecting chamber formed by the brake housing 8, which is common to both working chambers. The working fluid leaves the brake via an outlet hole 8a. An outlet line (not shown) is connected to this, and leads to an overflow valve for regulating the filling level of the brake. On the inner circumference of the sliding cylinder 9 in the vicinity of each of the holes 17, 27 pressure head fins 18 and 28 respectively are mounted and project radially inwardly. The pressure head fins are loaded by the circumferential flow which occurs inside the shell 7 when the brake is filled, and thus the fins displace the sliding cylinder 9 in the circumferential direction. On the inner face of the brake housing 8, there are two inwardly projecting stops 8b and 8c. Between these stops, there is a lug 9a on the sliding cylinder 9. Between each of the stops 8b, 8c and the lug 9a, respective compression springs 40 are braced. These hole the sliding cylinder 9 in a central position when the brake is empty. This central position is marked in all of the drawings. In this position, all holes 19, 29 in the sliding cylinder 9 coincide with the holes 17 or 27 in the shell 7. Both the working chambers are, therefore, connected to the outlet line 8a. As soon as working fluid enters the brake, the sliding cylinder 9 is displaced either to the right to the left, as viewed in FIGS. 2 and 3, according to the then rotary direction of the rotor bucket wheels 10, 20. If the cylinder 9 is displaced to the right, the holes 19 are closed and the holes 29 remain open. The reverse occurs when the sliding cylinder 9 is displaced toward the left. Thus, in one rotary direction, one of the working chambers of the brake is closed to the outlet duct 8a and in the other rotary direction, the other working chamber is closed. In FIG. 2, the circumferential flow which prevails when the rotary direction is "to the right" is indicated by an arrow U.

An inlet valve is arranged between the bucket wheels 20 and 21 and the connected gear housing 39. It comprises an axially sliding cylinder 36, which is concentric with the brake and comprises a body of rotation 32 that is attached to the gear housing 39, and which is constructed as a bearing for the sliding cylinder 36 and at the same time forms with this cylinder an annular pressure chamber 33. The pressure chamber 33 can be primed with pressure medium via a line 34 in order thereby to displace the sliding cylinder in the axial direction. When this occurs, the sliding cylinder 36 is displaced to rest against the seat therefor on the rear face of the stator bucket wheel 21, so that the inlet valve is closed. Opening of the inlet valve is effected, after the pressure in the chamber 33 has been reduced, by the displacement of the sliding cylinder 36 toward the right due to the urging by a spring 35.

In the embodiment shown in FIG. 5, only the shape of the openings 47 in the inner shell 43 and the shape of the sliding cylinder 41 differ from those shown in FIGS. 1 to 4. The brake housing 8 and all the other parts can remain the same. The sliding cylinder 41 has a plurality of grooves 46 parallel to the axis of the brake formed on its inner face between the holes 49. The material between the grooves 46 forms the ribs 48. These ribs take over the function of the pressure head fins 18, 28 shown in FIG. 1 to 4, whereby such fins no longer have to be individually attached to the sliding cylinder. So that the circumferential flow can reliably displace the sliding cylinder 41, the openings 47 in the shell 43 are very wide and are formed with a large opening angle toward the working chambers. The sliding cylinder 41 is again located in its central position in FIG. 5. If it is displaced in the clockwise direction, for example, when the brake is filled, then the holes 49 close. If it is displaced in the counter-clockwise direction, on the other hand, the holes 49 remain open.

In the embodiments described up to now, a single common sliding cylinder 9 or 41 is provided on the outer face of the shell 7. On the other hand, in the double brake shown in FIGS. 6, to 8 there are two separate sliding cylinders 51 and 52 inside the shell 57, located on either side of the dividing wall 56. This wall is again located between the rear faces of the rotor bucket wheels 10 and 20, which have outlet holes 13, 23. The sliding cylinders 51, 52 can again be displaced in the circumferential direction by the pressure head of the circumferential flow. For this purpose, they have a plurality of recesses 53 on their inner faces (FIG. 7) between which are formed the ribs 54 against which the circumferential flow acts. Each sliding cylinder 51, 52 has, for example, approximately square shaped holes 61, 62 as outlet holes, which are associated with rectangular shaped openings 58, 59 in the shell 57. So that each of the two sliding cylinders 51, 52 can support the displacement of the other, they are connected together with cross-bolts 55. These also serve as a stop to restrict the displacement and as a point of application for two counter-effective compression springs 60, which are braced against the shell 57. Acting in the same way as the springs 40 in FIGS. 3 and 4, the springs 60 hold the two sliding cylinders 51, 52 in the position in which all the holes 61, 62 lie under the openings 58, 59 when the brake is not being operated, so that both the working chambers are emptied. When they are displaced in one direction or the other, the effect of the sliding cylinders 51, 52 is the same as in the previously described embodiment.

The outlet sliding cylinders 9, 41 and 51, 52 of the fluid brakes described above are all displaceable circumferentially. However, as FIG. 9 shows, an outlet sliding cylinder 79 can be displaced in the axial direction of the coupling. This design is extremely simple, since the sliding cylinder 79 is comprised of only a relatively thin metal disc which rests in an annular groove 78 formed by the inner shell 77, 77a and disposed centrally. The sliding cylinder 79 is held in its central position by compression springs 70 when the brake is not being operated. So that the sliding cylinder 79 can be constructed in one piece, the inner shell is divided into two halves 77 and 77a, one of which bears the dividing wall 76. The outlet openings, 71, 72 are at an angle in the shell 77, 77a so that they open into the annular groove 78. It is expedient to provide sealing edges 73 on the side walls of the annular groove. If the brake is filled with working fluid and if its rotary direction is such that, for example, the working chamber on the left in FIG. 9 is the active one, then the fluid pressure established in the radially outer region of the left-hand chamber is considerably greater than in the other working chamber. This greater pressure and the faster flow speed which occurs in the outlet opening 71 of the active working chamber forces the sliding cylinder 79 toward the right, so that the outlet openings 72 of the inactive working chamber are closed. With rotation of the brake in the other rotary direction, the reverse occurs.

FIG. 10 is a simplified diagram of a double brake in which the stator bucket wheels 81, 91 are arranged back to back and form the central double bucket wheel. Correspondingly, the outer rotor bucket wheels 80, 90 are attached to a shaft 95. These are again surrounded at their circumferences and on their rear faces by shells 89, 88 or 99, 98 which are formed partly on the stator bucket wheels 81, 91 and partly on the outer brake housing 85. The shell parts 89, 99 have outlet openings 87, 97 in the vicinity of the rotor bucket wheels. An outlet sliding cylinder 82 is also provided, which can be constructed like the sliding cylinders 9 or 41 shown in FIGS. 1 to 5. The inlet line is indicated by an arrow 92. It opens out into an annular collecting trough 93 formed in the rotor bucket wheel 90. This trough is connected via inlet ducts 96 with the working chamber of the bucket wheels 90, 91. The trough 93 is connected via axis-parallel connecting ducts 94 with an annular space 84 formed in the rotor bucket wheel 80. From the space 84, inlet ducts 86 lead into the working chamber of the bucket wheels 80, 81. A sliding cylinder can be arranged on the shell 98 as an inlet valve, in front of the collecting trough 93, corresponding to the construction shown in FIG. 1.

The hydraulic separation of two working chambers inside the shell 88, 89; 99, 98 is shown in FIG. 10. The stator bucket wheels 81, 91 are arranged in the center. Therefore, these bucket wheels also perform the function of the dividing wall 6, 56, 76 in the previous embodiments of double brakes.

As an alternative to the design shown in FIG. 10, in a double brake with centrally arranged stator bucket wheels 81, 91, instead of providing an outlet sliding cylinder 82 which can be displaced in the circumferential direction, a sliding cylinder which can be displaced in the axial direction of the brake may also be used, corresponding to the sliding cylinder 79 shown in FIG. 9. In this case, the annular groove in which the sliding cylinder is housed is arranged between the stator bucket wheels 81 and 91, and the outlet ducts do not run through the rotor bucket wheels 80, 90 and the shell sections 89, 99 but instead connected directly from the working chambers through the stator bucket wheels 81, 91 into the annular groove.

Although the present invention has been described in connection with the preferred embodiments thereof, many variations and modifications will now become apparent to those skilled in the art. It is preferred, therefore, that the present invention be limited not by the specific disclosure herein, but only by the appended claims.

What is claimed is:

1. A hydrodynamic double brake, comprising:
    a pair of rotor bucket wheels, which are rotatable together in one direction and in the opposite direction;
    a pair of stator bucket wheels, with each said stator bucket wheel being associated with a respective said rotor bucket wheel to define two toroidal working chambers, which can be filled with a working fluid;
    all said bucket wheels including and supporting respective buckets that extend from the said wheel into the respective said working chambers; said buckets, viewed in cylindrical section through said working chambers, all being set at an angle in the same direction relative to the axis of rotation of said bucket wheels, and in said one rotary direction, the first said working chamber is predominantly active, and in said opposite rotary direction, the second said working chamber is predominantly active;
    a common inlet line communicating to both said working chambers;
    respective outlet ducts leading out from both said working chambers;
    a stationary shell which is stationary with respect to said stator bucket wheels and positioned around said bucket wheels and over said outlet ducts; said shell supporting an outlet valve arrangement for said outlet ducts; said outlet valve arrangement having at least one moving valve element placed and operative to be actuated by the pressure head of the flow of fluid prevailing in its vicinity in said working chambers, such that said outlet ducts from each said working chamber are open when the rotary direction of said brake is such that the respective said working chamber is active and the same said outlet ducts are closed when the rotary direction of said brake is such that the respective said working chamber is largely inactive.

2. The hydrodynamic double brake of claim 1, further comprising an inlet valve in said inlet line for selectively closing and opening said inlet line; said inlet valve comprising a sliding cylinder, concentric with the brake axis and displaceable axially and a valve seat against which said cylinder is displaced; upon displacement of said cylinder to said seat, it throttles said inlet line.

3. The hydrodynamic double brake of claim 1, further comprising said rotor bucket wheels being arranged back to back for rotation together;
    said common inlet line branching toward said two working chambers only within said rotor bucket wheels and then extending into said working chambers.

4. The hydrodynamic double brake of claim 3, further comprising a dividing wall extending radially inward of said brake from said shell toward the axis of said brake and between the back to back faces of said rotor bucket wheels, for creating two largely separate intermediate chambers inside said shell and separated by said wall; said outlet ducts from each said working chamber communicating into the respective said intermediate chamber, and said outlet valve arrangement also communicating with said intermediate chambers.

5. The hydrodynamic double brake of claim 1, further comprising said stator wheels being arranged back to back and being connected to said stationary shell;
said inlet line branching in both said rotor bucket wheels into inlet ducts which open out into both said working chambers.

6. The hydrodynamic double brake of one of claims 1, 3 or 5, wherein said outlet valve arrangement comprises a sliding cylinder extending around and radially outside said working chambers and said shell being shiftable with respect to said shell and being concentric with the axis of said brake.

7. The hydrodynamic double brake of claim 6, further comprising a respective valve arrangement for each said working chamber, and each said valve arrangement having a respective said moving valve element for its said working chamber.

8. The hydrodynamic double brake of claim 7, wherein each said moving valve element has a plurality of working fluid responsive elements that extend generally parallel to the axis of said brake and are located near the outer circumference of its said working chamber for being displaced by the pressure head in the vicinity of said working fluid responsive elements.

9. The hydrodynamic double brake of claim 7, wherein each said moving valve element is displaceable in the axial direction of said brake; said shell including a section defined therein in which said valve elements are located; said outlet ducts from said working chambers communicating to said shell section and said shell section, said valve elements and said outlet ducts being so shaped and positioned that shifting of said valve elements through said shell section selectively blocks said outlet ducts of said first and said second working chambers.

10. The hydrodynamic double brake of claim 7, wherein said two valve arrangements are linked such that movement of one said valve arrangement to the open position of its said outlet ducts shifts the other said valve arrangement to the closed position of its said outlet ducts, and vice versa.

11. The hydrodynamic double brake of claim 10, wherein the two said linked valve arrangements further comprise biasing means for normally urging the two said linked valve arrangements into a central position, when said brake is not operating; at said central position, said outlet ducts of both said working chambers being open.

12. The hydrodynamic double brake of claim 11, further comprising an inlet valve in said inlet line for selectively closing and opening said inlet line; said inlet valve comprising a sliding cylinder, concentric with the brake axis and displaceable axially and a valve seat against which said cylinder is displaced upon displacement of said cylinder to said seat, it throttles said inlet line.

13. The hydrodynamic double brake of claim 11, wherein said moving valve elements are displaceable in the circumferential direction of the brake.

14. The hydrodynamic double brake of claim 6, wherein said outlet valve arrangement for both said working chambers comprises a common moving valve element, having a first position which opens said outlet ducts of said first working chamber and closes said outlet ducts of said second working chamber, and having a second position, wherein the opposite result prevails.

15. The hydrodynamic double brake of claim 14, wherein each said moving valve element has a plurality of working fluid responsive elements that extend generally parallel to the axis of said brake and are located near the outer circumference of its said working chamber for being displaced by the pressure head in the vicinity of said working fluid responsive elements.

16. The hydrodynamic double brake of claim 14, wherein each said moving valve element is displaceable in the axial direction of said brake; said shell including a section defined therein in which said valve elements are located; said outlet ducts from said working chambers communicating to said shell section and said shell section, said valve elements and said outlet ducts being so shaped and positioned that shifting of said valve elements through said shell section selectively blocks said outlet ducts from said first and said second working chambers.

17. The hydrodynamic double brake of claim 6, wherein said sliding cylinder is displaceable circumferentially of said brake.

18. The hydrodynamic double brake of claim 6, further comprising biasing means for normally sliding said sliding cylinder into a central position, when said brake is not operating; at said central position, said outlet ducts of both said working chambers being open.

19. The hydrodynamic double brake of any of claims 1, 3 or 5, further comprising biasing means for normally sliding said sliding cylinder into a central position, when said brake is not operating; at said central position, said outlet ducts of both said working chambers being open.

20. The hydrodynamic double brake of any of claims 1, 3, 4 or 5, further comprising a respective said valve arrangement for each said working chamber, and each said valve arrangement having a respective said moving valve element for its said working chamber.

21. The hydrodynamic double brake of claim 20, wherein each said moving valve element has a plurality of working fluid responsive elements that extend generally parallel to the axis of said brake and are located near the outer circumference of the respective said working chamber for being displaced by the pressure head in the vicinity of said working fluid responsive elements.

22. The hydrodynamic double brake of claim 21, wherein said moving valve elements are displaceable in the circumferential direction of the brake.

23. The hydrodynamic double brake of claim 20, wherein each said moving valve element is displaceable in the axial direction of said brake; said shell including a section defined therein in which said valve elements are located; said outlet ducts from said working chambers communicating to said shell section and said shell section, said valve elements and said outlet ducts being so shaped and positioned that shifting of said valve elements through said shell section selectively blocks said outlet ducts of said first and said second working chambers.

24. The hydrodynamic double brake of claim 20, wherein said two valve arrangements are linked such that movement of one said valve arrangement to the open position of its said outlet ducts shifts the other said valve arrangement to the closed position of its said outlet ducts, and vice versa.

25. The hydrodynamic double brake of claim 24, wherein said moving valve elements are displaceable in the circumferential direction of the brake.

26. The hydrodynamic double brake of claim 23, wherein said outlet valve arrangement for both said working chambers comprises a common moving valve element, having a first position which opens said outlet ducts of said first working chamber and closes said outlet ducts of said second working chamber, and has a second position, wherein the opposite result prevails.

27. The hydrodynamic double brake of claim 26, wherein said moving valve elements are displaceable in the circumferential direction of the brake.

28. The hydrodynamic double brake of claim 26, wherein the two said linked valve arrangements further comprise biasing means for normally urging the two said linked valve arrangements into a central position, when said brake is not operating; at said central position, said outlet ducts of both said working chambers being open.

29. The hydrodynamic double brake of claim 28, wherein said moving valve elements are displaceable in the circumferential direction of the brake.

* * * * *